(12) United States Patent
Dougherty et al.

(10) Patent No.: US 8,251,597 B2
(45) Date of Patent: Aug. 28, 2012

(54) AERIAL SUPPORT STRUCTURE FOR CAPTURING AN IMAGE OF A TARGET

(75) Inventors: Edmond J. Dougherty, Wayne, PA (US); Gary Giegerich, Glenside, PA (US); Maury Bayer, Narberth, PA (US)

(73) Assignee: Wavecam Media, Inc., Ft. Washington, PA (US)

( * ) Notice: Subject to any disclaimer, the term of this patent is extended or adjusted under 35 U.S.C. 154(b) by 33 days.

(21) Appl. No.: 12/905,700

(22) Filed: Oct. 15, 2010

(65) Prior Publication Data

US 2011/0091196 A1    Apr. 21, 2011

Related U.S. Application Data

(60) Provisional application No. 61/279,155, filed on Oct. 16, 2009.

(51) Int. Cl.
*G03B 17/00* (2006.01)

(52) U.S. Cl. .......................... 396/428; 396/12

(58) Field of Classification Search .................. 396/419, 396/428, 7, 12; 348/144
See application file for complete search history.

(56) References Cited

U.S. PATENT DOCUMENTS

| | | |
|---|---|---|
| 367,610 A | 8/1887 | Fairman |
| 1,300,716 A | 4/1919 | Frolek |
| 4,657,267 A * | 4/1987 | Jaumann et al. ........... 280/47.11 |
| 4,710,819 A | 12/1987 | Brown |
| 4,858,000 A | 8/1989 | Lu |
| 5,034,759 A * | 7/1991 | Watson .............................. 396/7 |
| 5,224,426 A | 7/1993 | Rodnunsky et al. |
| 5,225,863 A | 7/1993 | Weir-Jones |
| 5,448,290 A | 9/1995 | VanZeeland |
| 5,508,737 A | 4/1996 | Lang |
| 5,568,189 A * | 10/1996 | Kneller ......................... 348/144 |
| 5,602,760 A | 2/1997 | Chacon et al. |
| 5,655,053 A | 8/1997 | Renie |
| 5,751,885 A | 5/1998 | O'Loughlin et al. |
| 5,752,088 A * | 5/1998 | Desselle ......................... 396/12 |
| 5,771,307 A | 6/1998 | Lu et al. |

(Continued)

FOREIGN PATENT DOCUMENTS

EP    0764927 A1    3/1997

(Continued)

OTHER PUBLICATIONS

Extended European Search Report, dated Jun. 23, 2009, in EP Application No. 06803158.2, 5 pages.

(Continued)

*Primary Examiner* — Clayton E LaBalle
*Assistant Examiner* — Warren Fenwick
(74) *Attorney, Agent, or Firm* — Panitch Schwarze Belisario & Nadel LLP (57) ABSTRACT

An aerial support structure for capturing an image of a target via a camera mounted thereon includes a support platform, a frame mounted to the support platform and a beam movably attached to the frame. A camera platform suspends and is axially spaced from the support platform by a plurality of support cables. An actuator is mounted to one of the support platform and the frame, and the actuator is associated with each of the plurality of support cables. Operation of the actuator causes the beam to move with respect to the frame, thereby moving the camera platform relative to the support platform.

15 Claims, 11 Drawing Sheets

U.S. PATENT DOCUMENTS

| | | | |
|---|---|---|---|
| 5,784,966 | A | 7/1998 | Brown et al. |
| RE36,041 | E | 1/1999 | Turk et al. |
| 5,946,444 | A | 8/1999 | Evans et al. |
| 6,145,679 | A | 11/2000 | Walters |
| 6,359,647 | B1 | 3/2002 | Sengupta et al. |
| 6,490,409 | B1 | 12/2002 | Walker |
| 6,532,345 | B1 | 3/2003 | Gluck |
| 6,542,621 | B1 | 4/2003 | Brill et al. |
| 6,591,068 | B1 | 7/2003 | Dietz |
| 6,608,563 | B2 | 8/2003 | Weston et al. |
| 6,618,075 | B2 | 9/2003 | Tomita |
| 6,690,374 | B2 | 2/2004 | Park et al. |
| 6,697,502 | B2 | 2/2004 | Luo |
| 6,698,943 | B2 | 3/2004 | Gluck |
| 6,775,411 | B2 | 8/2004 | Sloan et al. |
| 6,809,495 | B2 | 10/2004 | Rodnunsky |
| 6,809,762 | B1 | 10/2004 | Donnelly et al. |
| 6,819,783 | B2 | 11/2004 | Goldberg et al. |
| 6,873,355 | B1 | 3/2005 | Thompson et al. |
| 6,886,471 | B2 | 5/2005 | Rodnunsky |
| 7,077,581 | B2 | 7/2006 | Gluck |
| 2002/0085762 | A1 | 7/2002 | Shniberg et al. |
| 2002/0149681 | A1 | 10/2002 | Kahn et al. |
| 2002/0197074 | A1 | 12/2002 | Gluck |
| 2003/0023452 | A1 | 1/2003 | Novais et al. |
| 2003/0040943 | A1 | 2/2003 | Bates et al. |
| 2003/0190076 | A1 | 10/2003 | DeLean |
| 2004/0028391 | A1 | 2/2004 | Black et al. |
| 2004/0085334 | A1 | 5/2004 | Reaney |
| 2004/0135902 | A1 | 7/2004 | Steensma |
| 2004/0193493 | A1 | 9/2004 | King |
| 2004/0201738 | A1 | 10/2004 | Moores et al. |
| 2004/0218918 | A1 | 11/2004 | Gluck |
| 2005/0024004 | A1 | 2/2005 | Rodnunsky |
| 2005/0024005 | A1 | 2/2005 | Rodnunsky et al. |
| 2005/0068165 | A1 | 3/2005 | Kelliher et al. |
| 2005/0160936 | A1 | 7/2005 | MacDonald et al. |
| 2007/0047949 | A1 | 3/2007 | Gluck |
| 2007/0064208 | A1* | 3/2007 | Giegerich et al. ............. 353/122 |
| 2009/0103909 | A1* | 4/2009 | Giegerich et al. ............. 396/12 |

FOREIGN PATENT DOCUMENTS

| | | |
|---|---|---|
| ES | 2215454 A1 | 10/2004 |
| GB | 2380883 A | 4/2003 |
| JP | 2000032325 A | 1/2000 |
| JP | 2002152720 A | 5/2002 |
| JP | 2003030833 A | 1/2003 |
| JP | 2003125320 A | 4/2003 |
| JP | 2003143350 A | 5/2003 |
| JP | 2003244685 A | 8/2003 |
| JP | 2004289434 A | 10/2004 |
| JP | 2004356683 A | 12/2004 |
| WO | 8402199 A1 | 6/1984 |
| WO | 9519903 A1 | 7/1995 |
| WO | 9523053 A1 | 8/1995 |
| WO | 03069821 A1 | 8/2003 |
| WO | 2005/013195 A2 | 2/2005 |
| WO | 2005027023 A1 | 3/2005 |
| WO | 2005042385 A2 | 5/2005 |
| WO | 2007030665 A2 | 3/2007 |

OTHER PUBLICATIONS

International Search Report and The Written Opinion in Int'l Application No. PCT/US06/34941, dated Sep. 4, 2007, 11 pages.

"What is Java Advanced Imaging?", printout from web site: http://java.sun.com/products/java-media/jai/whatis.html, printout date: Sep. 4, 2006, 2 pages.

"Java Advanced Imaging (JAI) API", printout from web site: http:/java.sun.com/products/java-media/jai/, printout date: Sep. 4, 2006, 2 pages.

Event Pictures Search input screen, printout from web site: http://www.eventpictures.com/app/event/searchEventAdvanced, printout date: Sep. 6, 2006, 1 page.

Event Pictures—Sell Photos online, printout from web site: http://www.eventpictures.com/info/sell-photos-online.html, printout date: Sep. 6, 2006, 2 pages.

Int'l Preliminary Report on Patentability for PCT/US06/34941, dated Jun. 20, 2008, 9 pages.

* cited by examiner

AERIAL SUPPORT STRUCTURE FOR CAPTURING AN IMAGE OF A TARGET

CROSS-REFERENCE TO RELATED APPLICATIONS

The present application claims priority to U.S. Provisional Patent Application No. 61/279,155, filed Oct. 16, 2009 and entitled "Aerial Support Structure for Capturing an Image of a Target."

BACKGROUND OF THE INVENTION

The present invention is directed to an aerial support structure for capturing an image of a target and, more particularly, to an aerial support structure having only a single vertical actuator to selectively and vertically raise and lower a camera platform with respect to a support platform in a stable manner.

Several types of aerial support structures are well-known. In one conventional aerial support structure, a camera is mounted to a horizontally moving platform to provide various vantage points for capturing images using the camera. In another type of aerial support structure, a camera is suspended from various cables in a venue to provide variable vantage points for capturing images. These prior art aerial support structures have several independent components, such as actuators or winches. These aerial support structures are thus often difficult and time-consuming to construct and install and, therefore, are expensive to produce and maintain. In addition, conventional aerial support structures installed at a venue are often a distraction or obstacle for observers in specific types of settings.

In light of the above, it would be advantageous to develop an aerial support structure that is relatively inexpensive to construct, install and operate. Further, it is desirable to create an aerial support structure that (i) is capable of being at least partially prefabricated and then permanently installed in a venue, (ii) is able to quickly and safely move about the venue to capture images, (iii) is unobtrusive to viewing an event at the venue, and (iv) provides stable images from a camera. Specifically, it would be desirable to produce an aerial support structure that includes a single actuator or winch operatively connected to a plurality of cables to selectively and raise and/or lower a camera platform in a stable manner.

BRIEF SUMMARY OF THE INVENTION

Briefly stated, the present invention is directed to an aerial support structure for capturing an image of a target via a camera mounted thereon. The aerial support structure includes a support platform, a frame mounted to the support platform and a beam movably attached to the frame. A camera platform suspends and is axially spaced from the support platform by a plurality of support cables. An actuator is mounted to one of the support platform and the frame, and the actuator is associated with each of the plurality of support cables. Operation of the actuator causes the beam to move with respect to the frame, thereby moving the camera platform relative to the support platform.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "lower," "upper," "proximate" and "adjacent" designate directions in the drawings to which reference is made. Unless specifically set forth herein, the terms "a," "an" and "the" are not limited to one element, but instead should be read as meaning "at least one." The terminology includes the above-listed words, derivatives thereof and words of similar import.

Referring to the drawings in detail, wherein like numerals indicate like elements throughout, there is shown in FIGS. 1-13 an aerial support structure, generally designated as "10," in accordance with a preferred embodiment of the present invention. The aerial support structure 10 provides for the selective and stable vertical raising and/or lowering of a platform, such as a camera platform 12 supporting a camera 14 (shown in phantom above and/or below the camera platform 12 in FIG. 4), with respect to a ground surface (not shown) (i.e., the floor of a gymnasium) and/or a support platform 18 spaced a predetermined distance above the ground surface. As will be readily apparent from the description below, portions of the aerial support structure 10 can be prefabricated and/or preassembled at a location away from an arena or venue where the aerial support structure 10 is eventually mounted.

Figure 1:
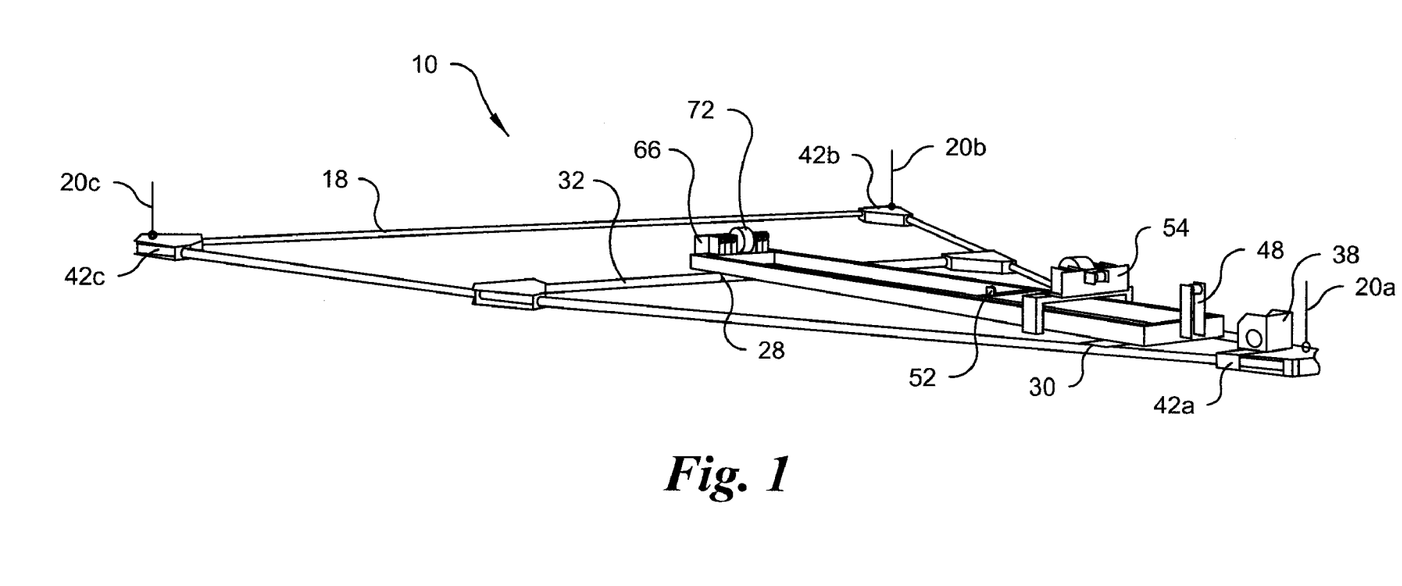
FIG. 1 is a top perspective view of a portion of an aerial support structure in accordance with a preferred embodiment of the present invention, with certain support cables and cords omitted for clarity.
Figure 2:
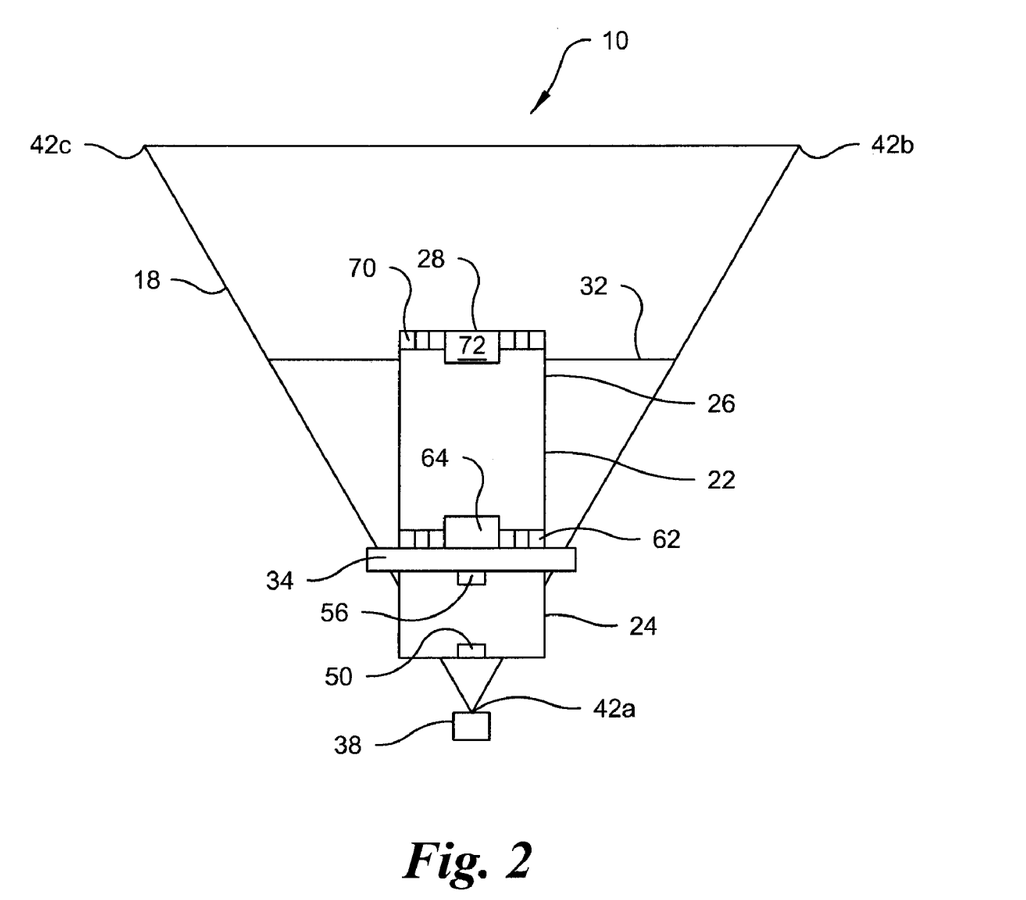
FIG. 2 is a schematic top plan view of a portion of the aerial support structure shown in FIG. 1, with certain support cables and cords omitted for clarity.
Figure 3:
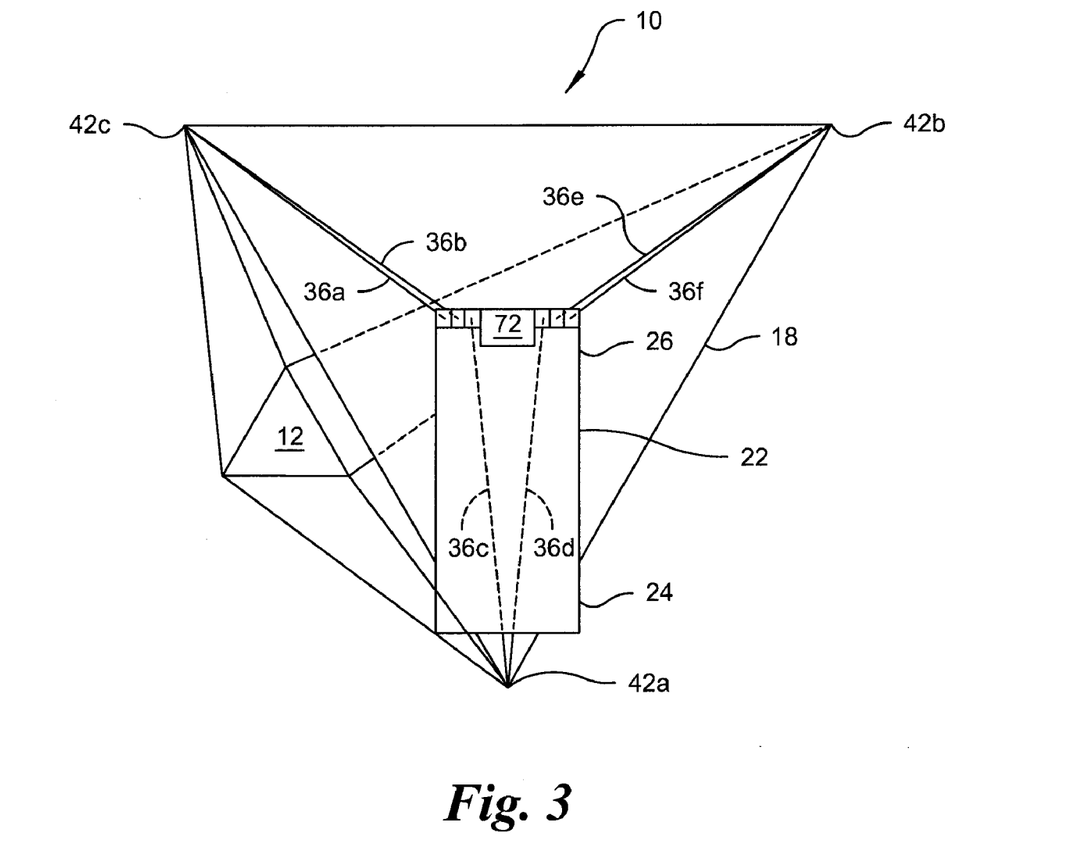
FIG. 3 is a schematic top plan view of a portion of the aerial support structure shown in FIG. 1, with a camera platform and support cables shown in a modified location for ease of illustration and explanation.

Referring to FIGS. 1-5, the support platform 18 preferably defines a generally equilateral triangle when viewed from above or below (FIGS. 2 and 3). In the preferred embodiment, three spaced-apart vertices or assembled joints 42a, 42b, 42c of the support platform 18 provide an inherently stable structure from which to suspend the camera platform 12. As described in detail below, the shape of the support platform 18 provides a Steward platform that allows for six degrees of freedom of the camera platform 12 (x, y, z, pitch, roll and yaw). In the preferred embodiment, the support platform 18 is constructed of a plurality of bars or rods that, when properly assembled, form a type of push-pin construction, which is generally inexpensive to produce and simple for a technician to assemble and may be prefabricated away from the venue. However, the platform 18 is not limited to such a configuration, as the support platform 18 may be a generally solid or integral piece.

In the preferred embodiment, the support platform 18 is mounted to a portion of a ceiling, roof, rafter, joist or girder (not shown) of a venue or arena. Specifically, each vertex 42a, 42b, 42c of the support platform 18 may be attached or connected to the ceiling of a venue by a vertically-extending tension cable 20a, 20b, 20c that allows the support platform 18 to be selectively raised and/or lowered in parallel with respect to the ceiling, such that maintenance may be performed on the aerial support structure 10 at the ground surface 16 (see FIG. 1). However, the support platform 18 is not limited to being a separate structure from the ceiling, roof or rafters of the venue. For example, the support platform 18 may simply be constructed from three generally equally spaced-apart points on the ceiling, roof or rafters, which generally form an equilateral triangle when viewed from above or below.

Figure 4:
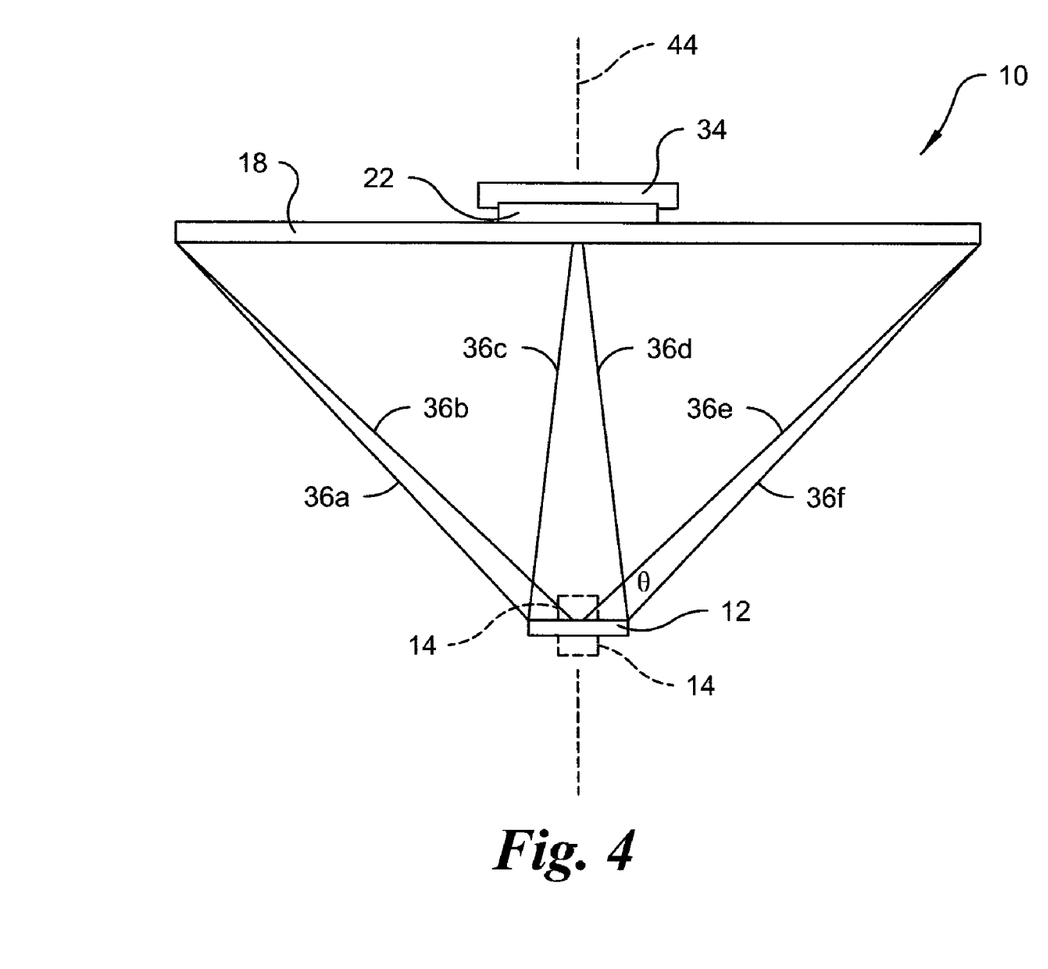
FIG. 4 is a side elevation view of the aerial support structure shown in FIG. 1 mounted in a venue.
Figure 5:
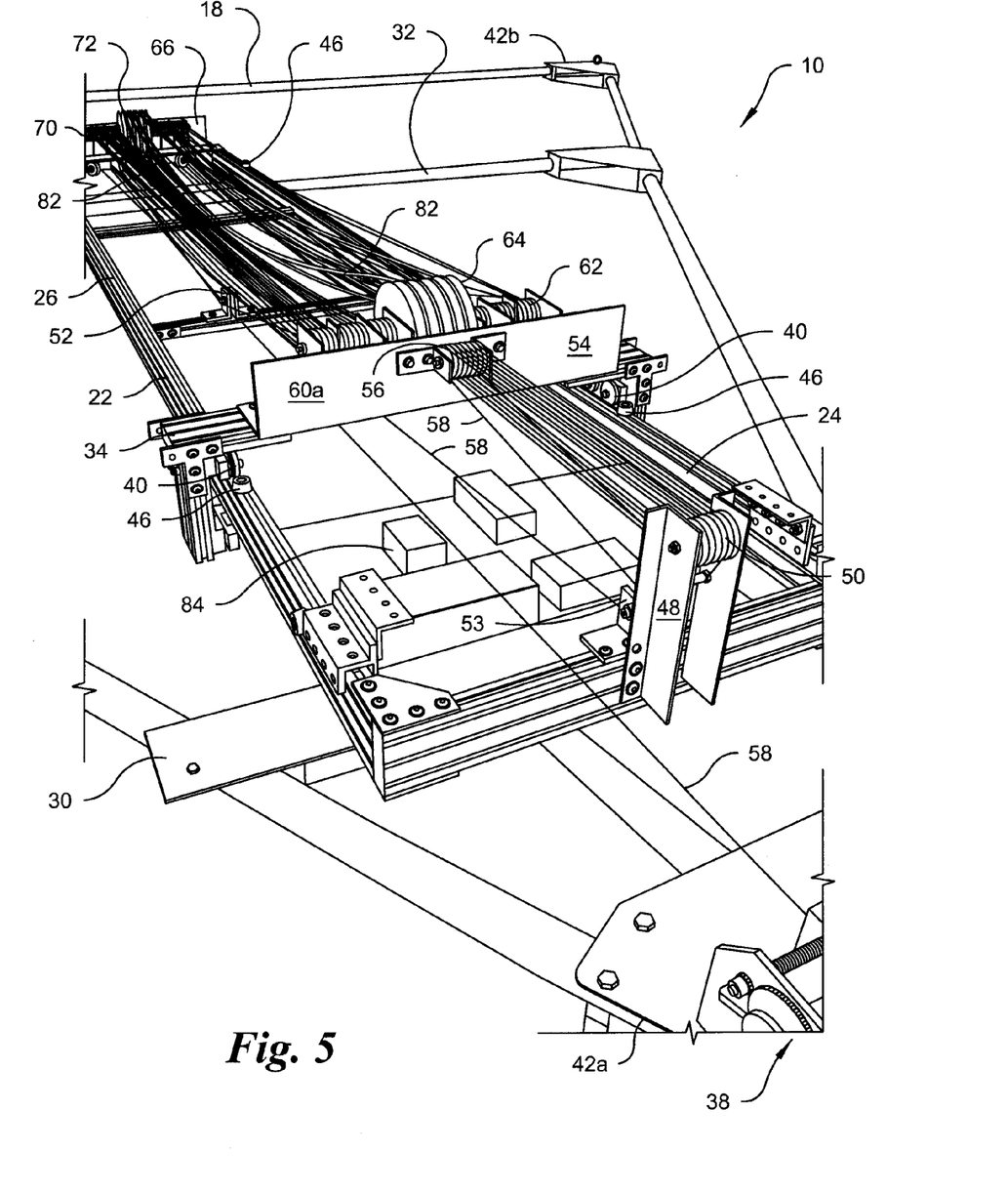
FIG. 5 is an enlarged top perspective view of a portion of the aerial support structure shown in FIG. 1.
Figure 6:
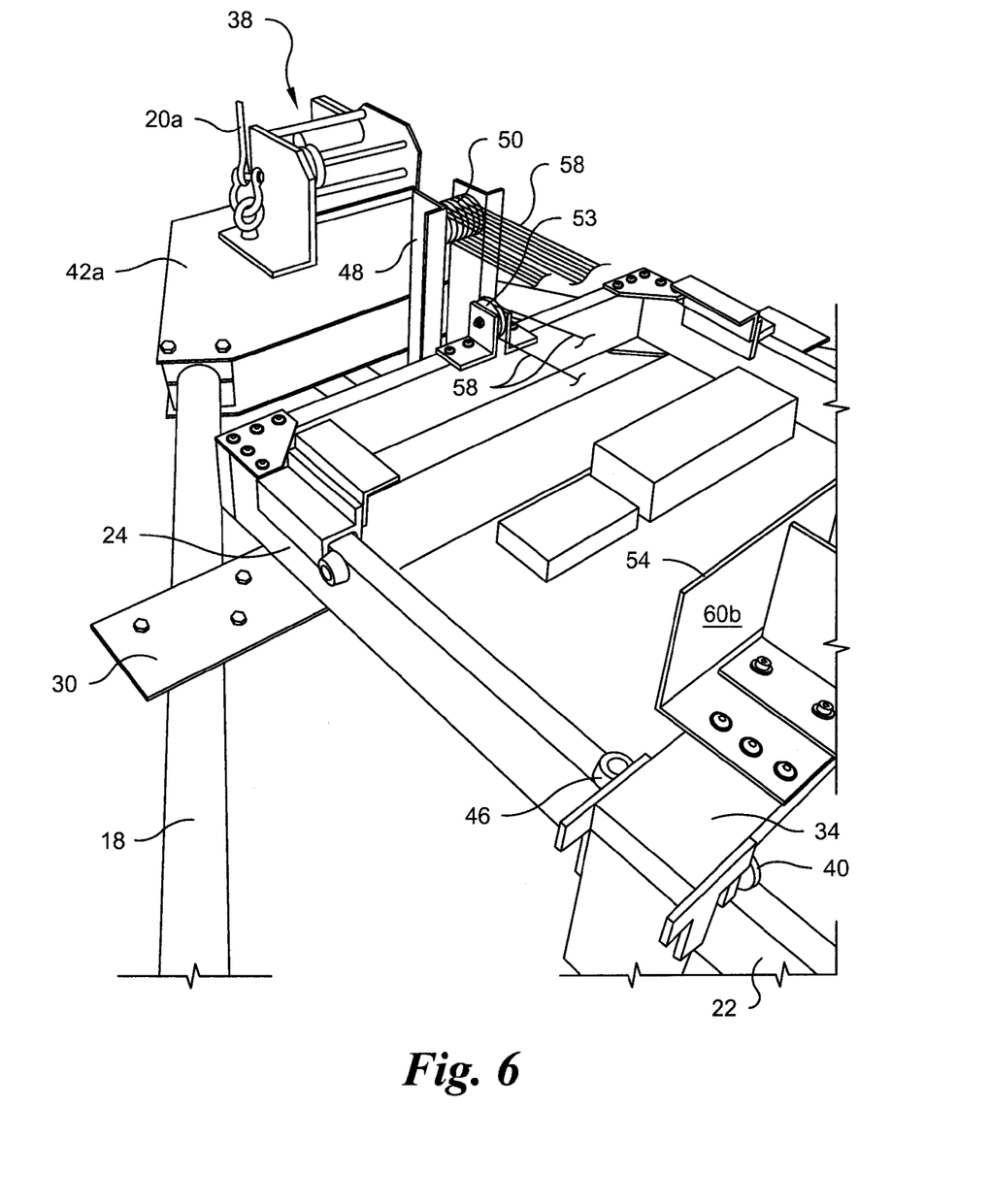
FIG. 6 is an enlarged top perspective view of a portion of the aerial support structure shown in FIG. 1, with certain support cords omitted for clarity.

Referring to FIGS. 1-7, 9, 10 and 12, the aerial support structure 10 preferably includes a frame or tray 22 mounted to the support platform 18. As shown in FIGS. 2, 3 and 5, the frame 22 has a generally rectangular configuration when viewed from above or below, but the frame 22 is not limited to such a shape. A first end 24 of the frame 22 is positioned generally proximate or adjacent to one of the three vertices 42, and preferably the first vertex 42a, of the support platform 18. A second end 26 of the frame 22, which is generally opposite the first end 24, is preferably positioned generally proximate or adjacent to a geometric center 28 of the support platform 18. In the preferred embodiment, and as shown in FIGS. 1, 5 and 6, the first end 24 of the frame 22 is fixedly attached to a first crossbar 30 that extends between an approximate end-portion of two of the rods of the support platform 18. As shown in FIGS. 1, 2 and 5, a second crossbar 32, which extends generally between an approximate mid-portion of the same two rods of the support platform 18 to which the first crossbar 30 is attached, preferably supports the second end 26 of the frame 22 on the support platform 18.

Referring to FIGS. 2 and 4-7, the aerial support structure 10 preferably includes a beam 34 movably attached to the frame 22. In the preferred embodiment, opposing end portions of the beam 34 are attached or connected to the frame 22 by at least one roller or bearing 40 (FIGS. 5 and 6), such that the beam 34 is slidable on the frame 22 from a first position (see FIG. 5), generally proximate or adjacent to the first end 22 of the frame 22, to a second position (not shown), generally proximate or adjacent to the second end 26 of the frame 22. As shown in FIG. 2, a longitudinal axis of the beam 34 is preferably generally perpendicular to a longitudinal axis of the frame 22. As shown in FIGS. 5-7, 9 and 10, the frame 22 may include one or more stops or abutments 46 to prevent or inhibit movement of the beam 34 beyond the first and second positions.

Referring to FIGS. 3 and 4, the camera platform 12 is preferably suspended and axially spaced from the support platform 18 by a plurality of spaced-apart support cables 36. The support cables 36 are typically held in tension by the force of gravity due to the suspension of the camera platform 12 from the support platform 18. In the preferred embodiment, the plurality of support cables 36 are comprised of a first support cable 36a, a second support cable 36b, a third support cable 36c, a fourth support cable 36d, a fifth support cable 36e and a sixth support cable 36f (FIGS. 3, 4 and 7-12). The six support cables 36 provide stability between the support platform 18 and the camera platform 12 and provide safety in suspending the camera platform 12 from the support platform 18, such that even if five of the six support cables 36 are severed, the remaining support cable 36 will continue to support the camera platform 12 relative to the support platform 18. The camera platform 12 is not limited to being suspended from the support platform 18 by the six support cables 36, but may be suspended from the support platform 18 by a lesser or greater number support cables 36. In addition, the camera platform 12 may be suspended from some other arena structure, such as a scoreboard, that permits vertical movement of the camera platform 12 between a raised or storage position and a lowered or deployed position.

In the preferred embodiment, the support cables 36 are relatively thin and may be approximately one millimeter (mm) or less in diameter. The support cables 36 may be constructed of a clear monofilament line, similar to that used as fishing line or may be comprised of fiber optic cables to transmit signals to and from the camera platform 12, a controller 86 (FIG. 13) or any other payload on the support platform 18 or related to the aerial support structure 10.

It is preferred that the camera platform 12 has the shape of a generally equilateral triangle (see FIG. 3), when viewed from above or below, to match the preferred shape of the support platform 18. In operation, a geometric center of the camera platform 12 is preferably generally directly below the geometric center 28 of the support platform 18. Specifically, it is preferred that the support platform 18 and camera platform 12 are coaxially mounted on a camera axis 44 (FIG. 4), which is a vertical imaginary axis that extends through the geometric center of both the support platform 18 and the camera platform 12. As shown in FIG. 3, which shows a hypothetical placement of the camera platform 12 off to the side of the support platform 18 for clarity and ease of illustration, the angular orientation of the camera platform 12 is generally offset from that of the support platform 18. Specifically, to increase stability of the camera platform 12, each vertex of the camera platform 12 preferably points toward generally a mid-point of a direct line between two vertices 42 of the support platform 18. Further, as shown in FIG. 3, it is preferred that an overall size and/or a top surface area of the camera platform 12 be considerably smaller than that of the support platform 18 to increase the stability of the camera platform 12.

In the preferred embodiment, the camera 14 is designed to capture images of a desired target. The camera 14 may be a still camera for taking still images, a video camera for taking video images, or a combined still and video camera for taking still and video images. The camera 14 may be preferably moveably mounted to the camera platform 12 to provide flexibility and adaptability to a user in selecting areas within the venue to target for image capture. In the preferred embodiment, the camera 14 is able to pan, tilt and zoom for capturing images virtually anywhere in the venue or wherever the aerial support structure 10 is mounted to capture images.

Referring to FIGS. 1, 2, 5 and 6, the aerial support structure 10 preferably includes an actuator 38 mounted to one of the support platform 18 and the frame 22 to effectuate vertical movement of the camera platform 12 via the support cables 36. As described in detail below, movement of the actuator 38 causes the beam 34 to move with respect to the frame 22, thereby moving the camera platform 12 relative to the support platform 18. As is described in detail below, the combination of the single actuator 38 and beam 34 increases an effective length of each support cable 36 without having to increase the actual length of each support cable 36. As a result, a smaller aerial support structure 10 is produced with support cables 36 of shorter length, as compared to the prior art.

Specifically, the actuator 38 operatively controls a cord 58 (FIGS. 5 and 6) that allows a user to selectively effectuate sliding movement of the beam 34 on the frame 22, which, in turn, effectuates vertical movement of the camera platform 12 relative to the support platform 18. In the preferred embodiment, the single actuator 38 is attached to the vertex 42a of the support platform 18 proximate the first end 24 of the frame 22 and is operatively connected to each of the plurality of support cables 36. The actuator 38 is preferably a winch, but may be virtually any device that can selectively raise and/or lower the camera platform 12. The actuator 38 may be mechanically/electrically driven or may be manually driven by an operator located on the support platform 18 or ground surface 16.

Figure 7:
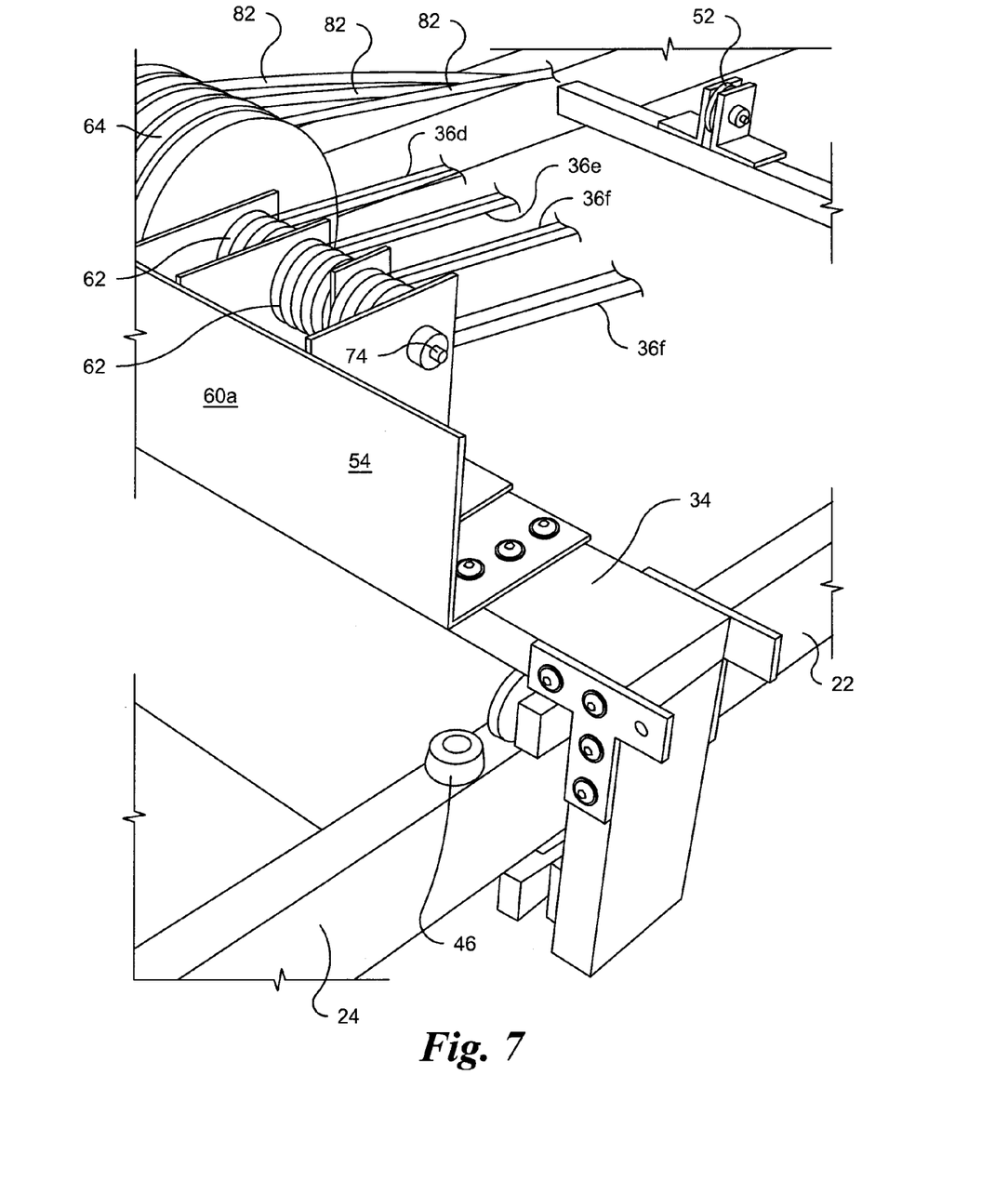
FIG. 7 is an enlarged top perspective view of a portion of the aerial support structure shown in FIG. 1.

As shown in FIGS. 1, 5 and 7, a guide pulley 52 is rotatably mounted to the frame 22 between generally the first and second ends 24, 26 thereof. Specifically, the guide pulley 52 is preferably positioned above the frame 22 and is offset from the longitudinal axis of the frame 22. However, the guide pulley 52 may be located in virtually any location, such as below the frame 22, that accomplishes the functions of the guide pulley 52 discussed herein. The guide pulley 52 preferably includes a wheel with a single groove therein, but the guide pulley 52 may have two or more wheels and/or grooves as deemed necessary. The wheel(s) and groove(s) of the guide pulley 52 are preferably generally parallel to the longitudinal axis of the frame 22, but may be angled slightly with respect to the longitudinal axis of the frame 22. In operation, a first end of the cord 58 is fixedly attached to the actuator 38 and a portion of the cord 58 extends from the actuator 38 and around at least a portion of the guide pulley 52. Specifically, as shown in FIG. 5, the cord 58 wraps around a portion of the groove(s) of the guide pulley 52 such that the guide pulley 52 redirects the cord 58 back toward actuator 38 at a slight angle, such as five degrees, offset from a plane defined by the taut cord 58 extending between the actuator 38 and the guide pulley 52.

As shown in FIGS. 5 and 6, it is preferred that a set pulley 53 be rotatably mounted to the frame 22 generally at or proximate to the first end 24 thereof. Specifically, the set pulley 53 is preferably positioned above the frame 22 and is located generally along the longitudinal axis of the frame 22. However, the set pulley 53 may be located in virtually any location, such as below the frame 22, that accomplishes the functions of the set pulley 53 discussed herein. It is preferred that the set pulley 53 includes a wheel with a single groove therein, but the set pulley 53 may have two or more wheels and/or grooves as deemed necessary. The wheel(s) and groove(s) of the set pulley 53 are preferably generally parallel to the longitudinal axis of the frame 22, but may be angled slightly with respect to the longitudinal axis of the frame 22. In operation, a portion of the cord 58 extends from the guide pulley 52 and wraps around at least a portion of the set pulley 53. Specifically, as shown in FIGS. 5 and 6, the cord 58 wraps around a portion of the groove(s) of the set pulley 53 such that the set pulley 53 redirects the cord 58 back toward the second end 26 of the frame 22 at a slight angle, such as five degrees, offset from a plane defined by the taut cord 58 extending between the guide pulley 52 and the set pulley 53.

Referring to FIGS. 1, 5 and 6, a preferred embodiment of the aerial support structure 10 includes a brace 48 that extends vertically from the first end 24 of the frame 22. A first or lower end of the brace 48 is fixedly attached to the frame 22 and a second or upper end of the brace 48 includes at least one base pulley 50 rotatably attached thereto. The base pulley 50 may be comprised of a single wheel with a groove therein or a plurality of wheels, in parallel or in a side-by-side configuration, each having a groove therein. The wheel(s) and groove(s) of the base pulley 50 are preferably generally parallel to the longitudinal axis of the frame 22, but the wheel(s) and groove(s) may be angled slightly with respect to the longitudinal axis of the frame 22. Further, as shown in FIGS. 1 and 5, in the preferred embodiment, a first bracket 54 is mounted to a top surface of the beam 34. A generally planar first sidewall 60a of the first bracket 54, which preferably faces toward the actuator 38, includes at least one pedestal pulley 56 rotatably mounted thereto. It is preferred that the pedestal pulley 56 includes the same number of wheels and grooves as the base pulley 50.

In operation, the cord 58 extends from the set pulley 53 on the frame 22 and wraps around at least a portion of the pedestal pulley 56. Specifically, as shown in FIG. 5, the taut cord 58 engages at least a portion of one of the grooves of the pedestal pulley 56, such that the groove(s) redirect(s) the cord 58 at a slight angle, such as five degrees, offset from a plane defined by the taut cord 58 extending between the set pulley 53 and the pedestal pulley 56. From there, the taut cord 58 extends to and around at least a portion of the base pulley 50 on the brace 48. Next, the cord 58 extends to and around at least a portion of the pedestal pulley 56 and then back to and around the base pulley 50, such that the cord 58 is wrapped or looped around the pedestal pulley 56 and base pulley 50.

The consecutive groove-by-groove wrapping or looping of the cord 58 preferably occurs several times, such as seven iterations. A second end of the cord 58 is preferably fixed to a portion of the pedestal pulley 56, such as in one of the end grooves of the pedestal pulley 56. Thus, rotation of the actuator 38 reels in or reels out the cord 58, which extends around at least a portion of the guide pulley 52, which then extends around at least a portion of the set pulley 53, which then consecutively extends around at least a portion of the pedestal pulley 56 and base pulley 50, which, in turn, causes the beam 34 to slide with respect to the frame 22. As a result, the rotation of the actuator 38 that reels in the cord 58 (i.e., clockwise) causes the beam 34 to slide toward the first end 24 of the frame 22, and rotation of the actuator 38 that reels out the cord 58 (i.e., counterclockwise) causes the beam 34 to slide toward the second end 26 of the frame 22.

As shown in FIGS. 2 and 5-7, a generally planar second sidewall 60b (FIG. 6) of the first bracket 54, which generally opposes the first sidewall 60a, includes at least one first transport pulley 62 rotatably mounted thereto. The at least one first transport pulley 62 may be comprised of a single wheel with a groove therein or a plurality of wheels in a side-by-side or co-linear configuration, each having a groove therein. The wheel(s) and groove(s) of the first transport pulley(s) 62 are preferably generally parallel to the longitudinal axis of the frame 22, but the wheels(s) and groove(s) may be angled slightly with respect to the longitudinal axis of the frame 22. In the preferred embodiment, six independent first transport pulleys 62 are placed in parallel or in a side-by-side configuration. However, the aerial support structure 10 may contain a greater or fewer number of first transport pulleys 62 as deemed necessary. Further, at least one first central pulley 64 is rotatably attached to the second sidewall 60b of the first bracket 54 and divides the six independent first transport pulleys 62 in half, such that three first transport pulleys 62 are located on either side of the first central pulley 64. In the preferred embodiment, the first central pulley 64 and each of the six first transport pulleys 62 share a common axis of rotation 74 (FIG. 7).

Referring to FIGS. 1, 5 and 8-10, in the preferred embodiment, a second bracket 66 is mounted to a top surface of the frame 22 proximate the second end 26 thereof. The second bracket 66 is preferably substantially similar to the first bracket 54, but has the opposite orientation as that of the first bracket 54. Specifically, a generally planar first sidewall 68a of the second bracket 66 faces away from the actuator 38, while a generally planar second sidewall 68b of the second bracket 66 faces toward the actuator 38 and the second sidewall 60b of the first bracket 54.

Similar to the first bracket 54, the second sidewall 68b of the second bracket 66, which generally opposes the first sidewall 68a, preferably includes at least one second transport pulley 70 rotatably mounted thereto. The at least one second transport pulley 70 may be comprised of a single wheel with a groove therein or a plurality of wheels in a side-by-side or co-linear configuration, each having a groove therein. The groove(s) of the second transport pulley(s) 70 is/are preferably generally parallel to the longitudinal axis of the frame 22, but the groove(s) may be angled slightly with respect to the longitudinal axis of the frame 22. In the preferred embodiment, six independent second transport pulleys 70 are placed in parallel or in a side-by-side configuration. However, the aerial support structure 10 may contain a greater or fewer number of second transport pulleys 70 as deemed necessary. Further, at least one second central pulley 72 is rotatably attached to the second sidewall 68b of the second bracket 66 and divides the six independent second transport pulleys 70 in half, such that three second transport pulleys 70 are located on either side of the second central pulley 72. In the preferred embodiment, the second central pulley 72 and each of the six second transport pulleys 70 share a common axis of rotation 76 (FIG. 9).

In the preferred embodiment, a first end of each of the six support cables 36a, 36b, 36c, 36d, 36e, 36f is preferably fixedly attached to one of the six first transport pulleys 62, such as in an end groove of one of the six first transport pulleys 62. A second end of each of the six support cables 36a, 36b, 36c, 36d, 36e, 36f is preferably fixedly attached to one vertex of the camera platform 12. Specifically, as described in detail below, each of the six support cables 36a, 36b, 36c, 36d, 36e, 36f preferably wraps or loops around one of the six first transport pulleys 62 and the six second transport pulleys 70 similar in manner to the wrapping of the cord 58 around the pedestal pulley 56 and base pulley 50 described above.

Figure 9:
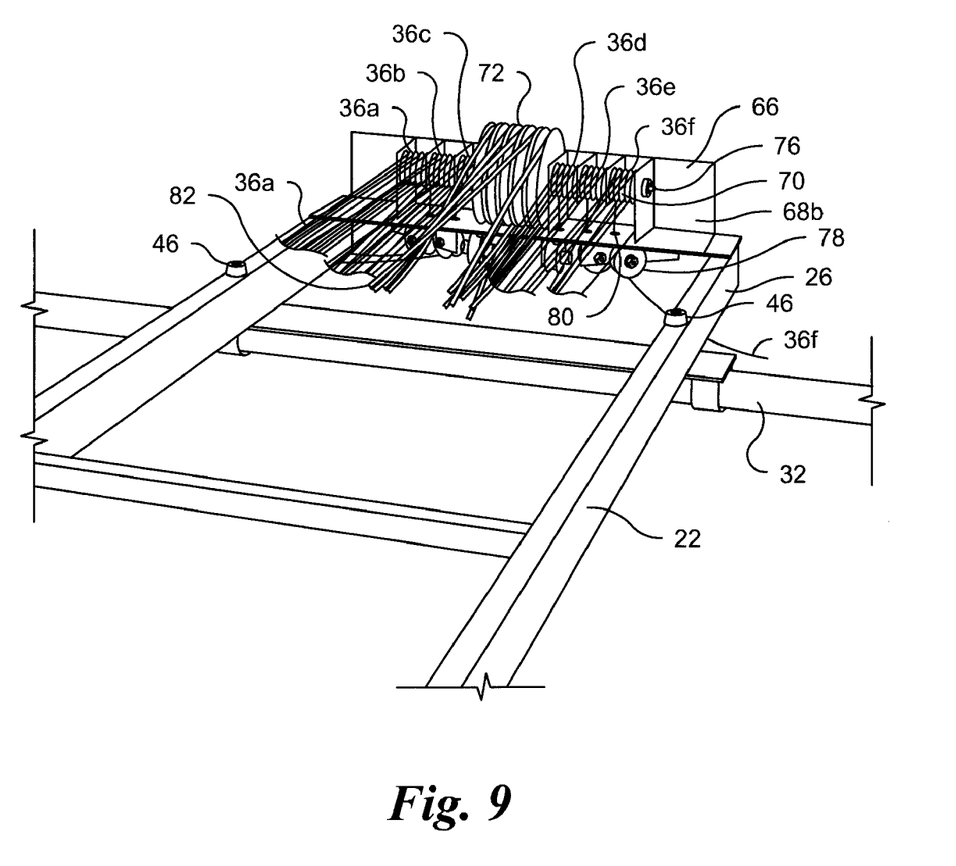
FIG. 9 is an enlarged perspective view of yet another portion of the aerial support structure shown in FIG. 1.
Figure 10:
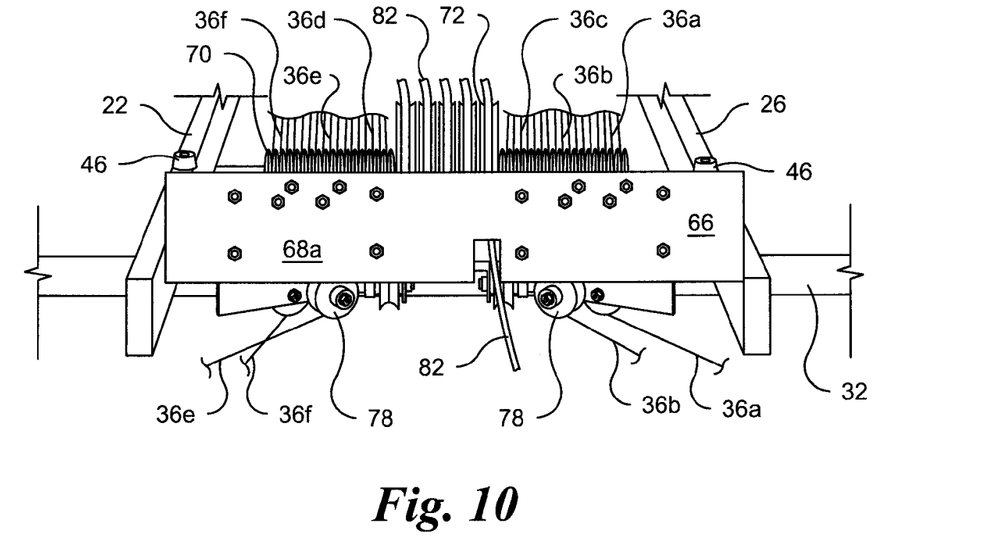
FIG. 10 is a top perspective view of a portion of the aerial support structure shown in FIG. 1.
Figure 11:
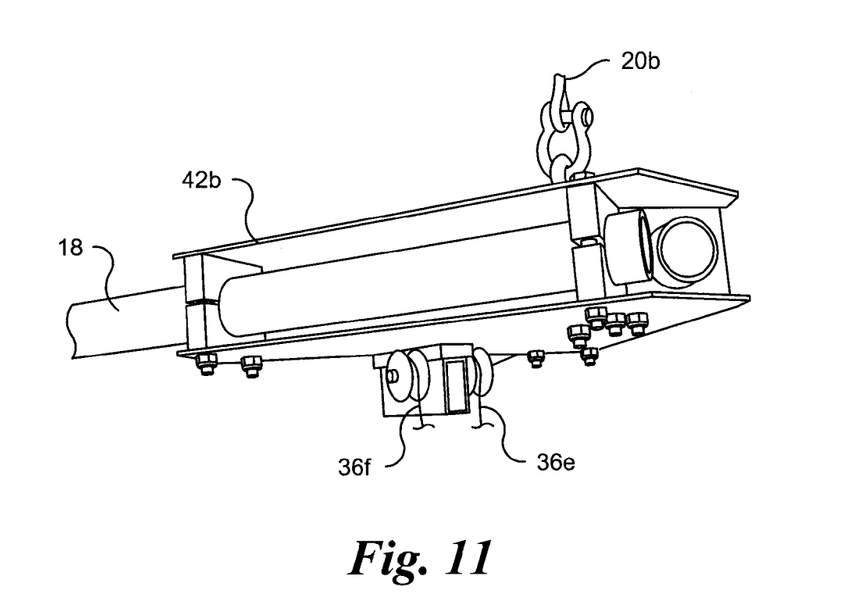
FIG. 11 is a bottom perspective view of a portion of the aerial support structure shown in FIG. 1.
Figure 12:
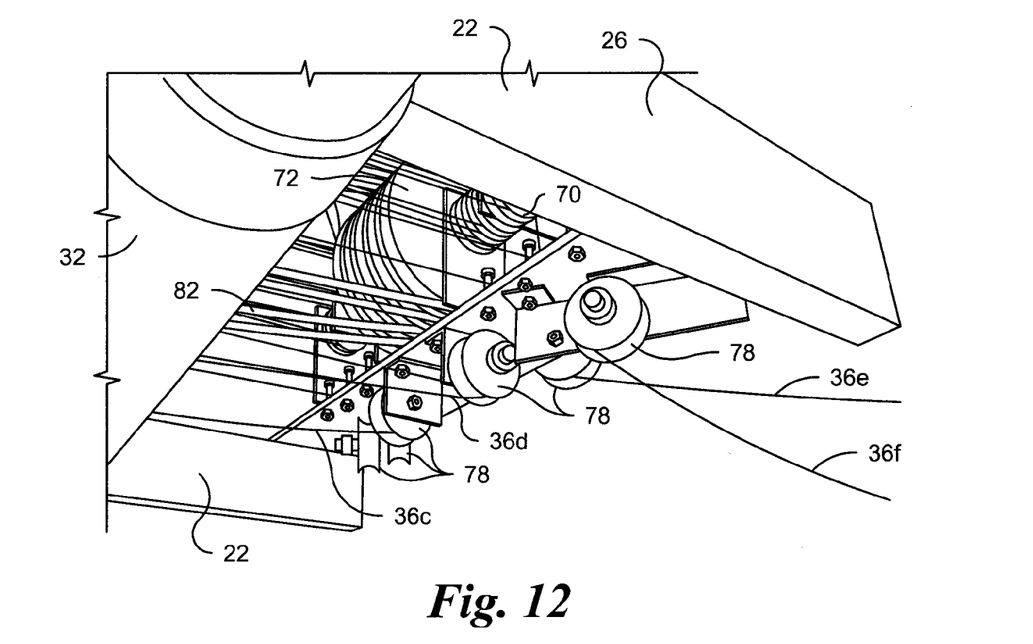
FIG. 12 is an enlarged bottom perspective view of a portion of the aerial support structure shown in FIG. 1.

Referring to FIGS. 9-12, the aerial support structure 10 preferable includes at least one directional pulley 78 mounted to a lower or bottom side of the frame 22 proximate the second end 26 thereof. Specifically, six independent directional pulleys 78 are rotatably mounted on the bottom side of the frame 22, each directional pulley 78 being mounted generally vertically below one of the six second transport pulleys 70. To properly orient each support cable 36 with respect to a vertex of the camera platform 12, an axis of rotation of each directional pulley 78 extends generally in a direction that is non-parallel to or offset from the axis of rotation 74 of each of second transport pulleys 70. As shown in FIG. 10, the offset angle between a cooperating pair of directional pulleys 78 and the second transport pulleys 70 is greater for the two outside pair of directional pulleys 78 (corresponding to support cables 36a, 36b and 36e, 36f, respectively) than it is for the pair of middle directional pulleys 78 (corresponding to support cables 36c, 36d).

Figure 8:
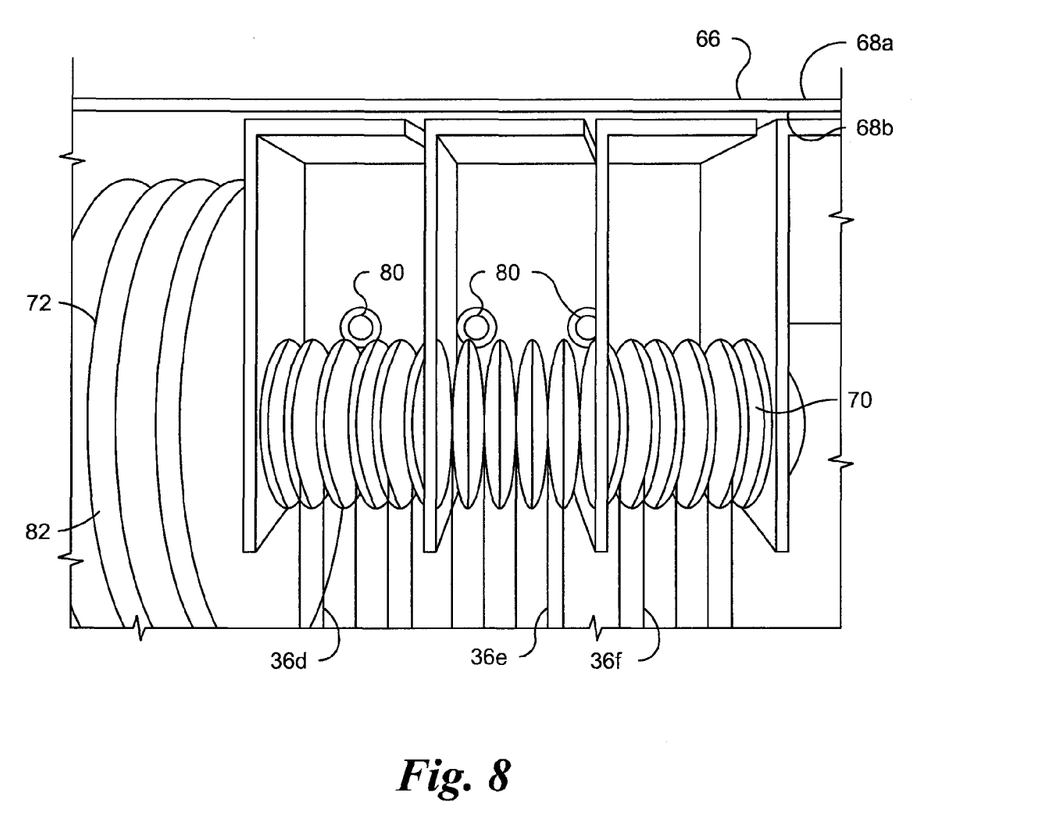
FIG. 8 is an enlarged top plan view of several pulleys of the aerial support structure shown in FIG. 1.

As shown in FIGS. 8 and 9, it is preferred that at least one opening or passageway 80 extends through a portion of the second end 26 of the frame 22 and/or a lower end of the second bracket 66. In the preferred embodiment, six spaced-apart openings 80 extend generally across the second end 26 of the frame 22. Each opening 80 is preferably positioned vertically below an end groove of each of the six second transport pulleys 70 and is sized and shaped to receive at least a portion of one of the six support cables 36a, 36b, 36c, 36d, 36e, 36f therethrough.

In operation, each of the six support cables 36a, 36b, 36c, 36d, 36e, 36f preferably extends, wraps or loops around both the first and second transport pulleys 62, 70 four times, such that each support cable 36 wraps or loops around the first and second transport pulleys 62, 70 and rests or sits within a separate and consecutive groove of each transport pulley 62, 70. Once each of the six support cables 36a, 36b, 36c, 36d, 36e, 36f extends around a portion of the fourth or end groove of the second transport pulley 72, each support cable 36a, 36b, 36c, 36d, 36e, 36f extends through one of the openings 80 to one of the six directional pulleys 78. As shown in FIG. 3 and discussed above, each of the six directional pulley 78 is preferably angled toward one of the vertexes (vertices) of the camera platform 12. In the preferred embodiment, the center pair of directional pulleys 78 (corresponding to support cables 36c, 36d) are angled or directed toward the same vertex of the camera platform 12. Further, the two outside pairs of directional pulleys 78 (corresponding to support cables 36a, 36b and 36e, 36f, respectively) are also angled or directed toward the same vertex of the camera platform 12. As shown in FIG. 4, each support cable 36 extends at an angle θ with respect to vertical camera axis 44. The angle θ provides increased stability to the camera platform 12.

Referring to FIGS. 5, 7-10 and 12, a transport cable 82 extends, wraps or loops around both the first and second central pulleys 64, 72 several times, such that the transport cable 82 wraps or loops around the first and second central pulleys 64, 72 and rests or sits within a separate and consecutive groove of each pulley 64, 72. Specifically, a first end of the transport cable 82 is operatively connected to a circuit board 84 mounted to one of the frame 22 and support platform 18, and a second end of the transport cable 82 is operatively connected to one of the camera 14 and camera platform 12. The transport cable 82 preferably sends electrical operational signals to the camera 14 and/or camera platform 12. The preferred transport cable 82 is comprised of a fiber optic cable that provides signals, such as control information, transmits signals, such as images, and/or provides power to the camera 14. However, the transport cable 82 may be constructed of a steel cable, for example, that is mounted directly to the first central pulley 64 and/or the support platform 18 at one end, and the camera 14 at an opposite end to provide a fail-safe or safety cable in the event that each of the support cables 36 are severed, thereby preventing the camera 14 and camera platform 12 from falling or becoming disengaged from the support platform 18.

Figure 13:
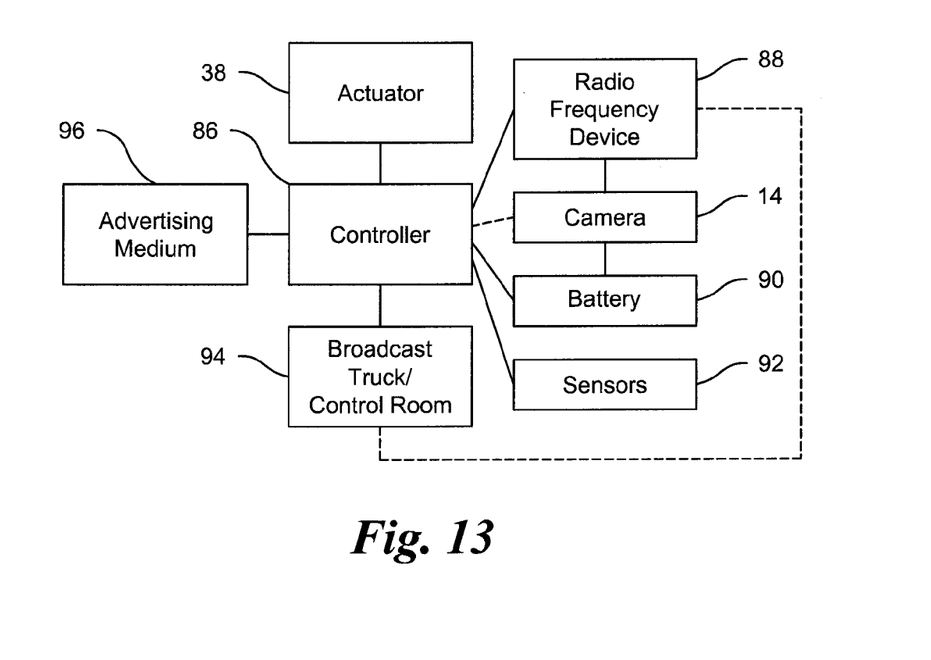
FIG. 13 is a block diagram of a control system of the aerial support structure shown in FIG. 1.

Referring to FIG. 13, the controller 86, which is preferably mounted to one of the frame 22 and support platform 18, is operatively connected to at least one of the camera 14, the actuator 38, a radio frequency device 88, a battery 90, a sensor 92, a broadcast truck or control room 94 and an advertising medium 96. In the preferred embodiment, the advertising medium 96 may be mounted to the support platform 18 and/or the camera platform 12, and is comprised of, for example, a banner with a printed advertisement thereon. However, the advertising medium may be signage with a backlit image, a projector that projects images onto a banner, the venue, the camera platform 12 or the support platform 18, an electronically controlled sign or nearly any other advertising medium that is able to convey an advertising message to persons, such as patrons within the venue.

In the first preferred embodiment, the battery 90 is mounted to one of the support platform 18 and the frame 22 to provide power to at least the camera 14. In addition, the controller 86 and radio frequency device(s) 88 are mounted to the support platform 18 or frame 22 for storing images captured by the camera 14 and transmitting images from the camera 14 to the controller 86, respectively. The radio frequency device(s) 88 may also be utilized to transmit command signals from the controller 86 to the camera 14 or command signals from the controller 86 to the actuator 38 or the advertising medium 96. The aerial support structure 10 is not limited to the inclusion of a controller 86, radio frequency device 88 and advertising medium 96, but these structures may be mounted to other portions of the aerial support structure 10 or nearly anywhere inside or outside of the venue.

The controller 86 may provide stability to the images for the aerial support structure 10 by controlling the acceleration and deceleration of the actuator 38 and movement of the camera 14 during various conditions. For example, controlling the rate of acceleration and deceleration of the movement of the camera platform 12 relative to the support platform 18 through the actuator 38 will typically increase stability by reducing any jumpiness or vibration between the camera platform 12 and the support platform 18. Further, the controller 86 may be in communication with the sensor(s) 92, which include optical sensors, accelerometers, inertial sensors, inclinometers, anemometers, thermometers, vibration meters, strain gauges or other similar sensors and are able to sense movement of the camera 14, camera platform 12 and/or support platform 18 or various environmental conditions. As a result, the controller 86 is able to react to the information received from the sensor(s) 92 to stabilize the aerial support structure 10.

As discussed above, the aerial support structure 10 is preferably mounted in the venue, typically a sporting arena. The arena preferably includes an observed area, a seating area and a line of sight from the seating area to the observed area. The support platform 18 and camera platform 12 are preferably mounted outside of each line of sight or are programmed to prevent movement into each of the lines of sight of the venue or arena. Accordingly, persons, such as patrons in the seating area, are able to observe events or other activities occurring in all portions of the observed area within their line of sight without their view being obstructed by the support platform 18 and/or camera platform 12.

It will be appreciated by those skilled in the art that changes could be made to the embodiments described above without departing from the broad inventive concept thereof. For example, the preferred embodiments of the aerial support structure 10 may capture video and still images at sporting events, providing security, video and still images at conventions, aquatic observation and monitoring of hazardous clean-up sites or other similar uses. It is understood, therefore, that this invention is not limited to the particular embodiments disclosed, but is intended to cover modifications within the spirit and scope of the present invention as defined by the present disclosure and/or the appended claims.

We claim:

1. An aerial support structure for capturing an image of a target via a camera mounted thereon, the aerial support structure comprising:
   a support platform;
   a frame mounted to the support platform;
   a beam movably attached to the frame;
   a camera platform suspended and axially spaced from the support platform by a plurality of support cables; and
   an actuator mounted to one of the support platform and the frame, the actuator being associated with each of the plurality of support cables,
   wherein operation of the actuator causes the beam to move with respect to the frame, thereby moving the camera platform relative to the support platform.

2. The image capturing mechanism of claim 1 further comprising:
   a controller in communication with the actuator to control the operation of the actuator.

3. The image capturing mechanism of claim 2 wherein the support cables are comprised of first, second, third, fourth, fifth and sixth support cables.

4. The image capturing mechanism of claim 2 further comprising:
   a radio frequency device mounted to the support platform for transmitting at least one of images from the camera to the controller, command signals from the controller to the camera, and command signals from the controller to the actuator.

5. The image capturing mechanism of claim 1 further comprising:
   an advertising medium mounted to one of the camera platform and the support platform.

6. The image capturing mechanism of claim 1 further comprising:
   a fiber optic transport cable extending from the camera to the support platform transmitting information from the camera to the support platform.

7. The image capturing mechanism of claim 1 wherein at least one of the support cables is a fiber optic cable to transmit signals to and from the camera platform.

8. The image capturing mechanism of claim 1 wherein the beam slides horizontally with respect to the frame and the camera platform moves vertically with respect to the support platform.

9. The image capturing mechanism of claim 8 further comprising:
   a first bracket mounted to a top surface of the beam;
   at least one pulley rotatably mounted to the first bracket;
   a second bracket mounted to the top surface of the beam; and
   at least one pulley rotatably mounted to the second bracket.

10. The image capturing mechanism of claim 9 further comprising:
    a brace extending upwardly from the frame; and
    a pulley rotatably mounted to the brace.

11. The image capturing mechanism of claim 1 wherein the support platform has a triangular shape and the frame has a rectangular shape.

12. The image capturing mechanism of claim 1 wherein opposing end portions of the beam are attached to the frame by at least one roller or bearing such that the beam is slidable with respect to the frame.

13. The image capturing mechanism of claim 1 wherein a longitudinal axis of the beam extends generally perpendicularly to a longitudinal axis of the frame.

14. The image capturing mechanism of claim 1 wherein the frame includes at least one stop to prevent or inhibit movement of the beam.

15. The image capturing mechanism of claim 1 wherein the support platform includes three spaced-apart vertices, each vertex being attached to a ceiling of a venue by a vertically-extending tension cable.

* * * * *